Figure 1:
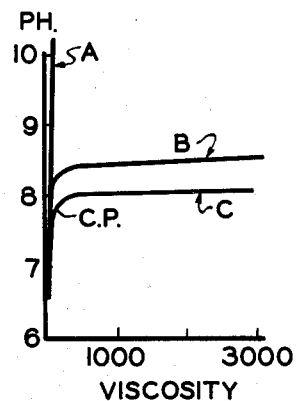

United States Patent Office 3,238,168
Patented Mar. 1, 1966

3,238,168
COPOLYMERS OF ALKYL HALF ESTERS OF ITACONIC ACID AND AQUEOUS SOLUTIONS THEREOF
Norwin Wolff, Cambridge, and Thomas B. Pitrolffy-Szabo, Boston, Mass., assignors to A. E. Staley Manufacturing Company, Decatur, Ill., a corporation of Delaware
Filed May 21, 1962, Ser. No. 196,334
20 Claims. (Cl. 260—29.6)

This invention relates to novel emulsion copolymers of alkyl esters of alpha, beta-ethylenically usaturated monocarboxylic acids and monoalkyl esters of itaconic acid, their salts and the coatings therefrom. These copolymers form water-thin solutions in aqueous alkali.

Polymeric esters of alpha, beta-ethylenically unsaturated monocarboxylic acids, which are generally water-insoluble and dilute alkali-insoluble, have been widely used for coating paper, floors, textiles, etc. Usually polymers produced by aqueous emulsion polymerization have been used in preference to polymers produced by solution polymerization, etc. The aqueous emulsion polymers have many advantages over comparable polymers of the same molecular weight prepared by the polymerization of the same monomers in organic solution. The advantages can be classified into three main categories: (1) the low viscosity of the aqueous emulsion polymers at high total solids, (2) processing advantages inherent in emulsion polymerization and (3) the use of water as the polymerization and the coating medium for the polymeric materials. While both types of polymers can be prepared by the direct polymerization of the desired monomeric material and then subsequently coated from the reaction medium, aqueous emulsion polymers can be prepared at a much higher total solids concentration due to the fact that polymeric solutions are considerably more viscous than aqueous polymeric emulsions at the same total solids concentration. (See An Introduction to the Organic Chemistry of High Polymers by Marvel, pages 37–38, 1959, John Wiley & Co. and British Patent No. 703,005). The lower viscosity of the emulsion polymers permits the shipment of these polymeric materials at a much higher total solids concentration, thereby lowering shipping costs, an appreciable factor. Further, the lower viscosity and/or higher total solids concentration is often very important industrially since low viscosity aids application by machine, brush, spraygun, etc. and high total solids content imparts fast drying, quick setting, etc. While the viscosity of polymeric materials produced in organic solution can be minimized to some extent by producing polymers of decidedly lower molecular weight, this is usually not desirable because desirable properties (tensile strength and/or elongation) are often lost when the molecular weight is low.

Polymerizations carried out in organic solution are considerably slower than polymerizations carried out in aqueous emulsion and the polymerizations tend to terminate with substantial proportions of unreacted monomer and/or low polymers (dimers, trimers, etc.). Further, organic solvents (1) generally tend to act as chain transfer agents resulting in lower molecular weight polymers and/or telomers; (2) are hazardous due to toxicity and/or flammability of their vapors, etc.; and (3) are considerably more expensive than water.

While the aqueous emulsion polymers have all of the foregoing advantages, polymers in solution have other advantages. Polymers deposited from solution usually coat larger areas weight for weight and have a higher tensile strength than the same polymers deposited from emulsion. Levelling (especially in a curtain coater) and adhesion to many types of surfaces are also better when solutions are used. For example, adhesion is better on chalky surfaces. In some industrial uses, such as warp sizing synthetic fibers, the low viscosity of aqueous emulsion polymers is a decided drawback. Further, polymeric solutions and coating compositions based thereon are much more stable than polymeric emulsions and coating compositions based thereon. For example, various salts tend to break emulsions by coagulating the polymeric material. An even more serious problem is the tendency of polymeric emulsions to be broken by freezing and thawing, thereby seriously complicating the shipping and storage of polymeric emulsions during the winter months. Generally, once the emulsion is broken it can not be reconstituted without first dissolving the polymeric material in an organic solvent.

The general object of this invention is to provide a series of high molecular weight coating polymers of alkyl esters of alpha, beta-ethylenically unsaturated monocarboxylic acids, which can be prepared by aqueous emulsion polymerization having all the advantages, particularly processing advantages, of the aqueous emulsion polymers, and which can be dissolved in dilute alkali to form an aqueous solution of controlled viscosity having all the advantages of solution polymers. A somewhat more specific object of this invention is to provide a series of high molecular weight coating polymers of alkyl esters of alpha, beta-ethylenically unsaturated monocarboxylic acids having at least the following characteristics: (1) can be produced by emulsion polymerization, (2) can be produced in aqueous media, (3) can be dissolved at moderately high total solids in dilute alkali without appreciably increasing the viscosity of the polymeric system, (4) can be dissolved at moderately high total solids in alkali to form a viscous polymeric system, (5) can be shipped in either the emulsified form or in the solution form at high total solids, (6) can be coated as a water-thin solution or as a viscous solution at moderately high total solids depending upon the desire of the coater, (7) form a freeze-thaw stable solution.

In one aspect, this invention is an aqueous alkaline solution of a copolymer of an alkyl ester of an alpha, beta-ethylenically unsaturated monocarboxylic acid and a monoalkyl ester of itaconic acid.

In a second aspect, this invention is an aqueous emulsion copolymer of an alykyl ester of an alpha, beta-ethylenically unsaturated monocarboxylic acid and a monoalkyl ester of itaconic acid.

In a third aspect this invention is a coating composition comprising an aqueous alkaline solution of an alkyl ester of an alpha, beta-ethylenically unsaturated monocarboxylic acid and a monoalkyl ester of itaconic acid.

In a fourth aspect, this invention is a process of preparing an aqueous emulsion copolymer of an alkyl ester of an alpha, beta-ethylenically usaturated monocarboxylic acid and a monoalkyl ester of itaconic acid which comprises polymerizing an aqueous emulsion of an alkyl ester of an alpha, beta-ethylenically unsaturated monocarboxylic acid and monoalkyl ester of itaconic acid in the presence of a free radical catalyst at an acidic pH.

In another aspect, this invention is a process of dissolving an aqueous emulsion copolymer of an alkyl ester of an alpha, beta-ethylenically unsaturated monocarboxylic acid and a monoalkyl ester of itaconic acid in equeous alkali.

In still another aspect, this invention is a process of coating a substrate with an aqueous alkaline solution of a copolymer of an alkyl ester of an alpha, beta-ethylenically unsaturated monocarboxylic acid and a monoalkyl ester of itaconic acid.

As pointed out above, high molecular weight polymers of alkyl esters of alpha, beta-ethylenically unsaturated monocarboxylic acids are generally water-insoluble and dilute-alkali insoluble. However, some of these polymers can be rendered alkali soluble by the partial hydrolysis of a substantial number of ester groups and/or by the copolymerization of the alkyl esters of alpha, beta-ethylenically unsaturated monocarboxylic acids with monomers such as acrylic acid and/or methacrylic acid (see U.S. Patent 3,026,281). Unfortunately, at a comparable molecular weight, these polymers are extremely viscous at low total solids concentration. For example, at a pH of about 8.2 Hycryl A–1000, which is an aqueous ammoniacal solution of a partially hydrolyzed polymer of an ester of acrylic acid, has a viscosity of from about 18,000 to 30,000 centipoises (cps.) at 6–7% by weight total solids.

I have now found that high molecular weight copolymers of alkyl esters of alpha, beta-ethylenically unsaturated monocarboxylic acid and monoalkyl esters of itaconic acid having molecular weight of approximately 10,000 to 150,000 or higher, and preferably in excess of 25,000, can be prepared by aqueous emulsion polymerization techniques having the unexpected property of dissolving in dilute aqueous alkali to form polymeric solutions having an extremely low viscosity for their total solids concentration. When dissolved in aqueous ammonia, the polymers of this invention have viscosities of less than about 1,000 cps. (usually less than 300 cps.) at 25% total solids at a pH of about 8.2 in contrast to Hycryl A–1000's viscosity of 18,000 to 30,000 cps. at 6–7% total solids. The extremely low viscosity of the copolymers of this invention is particularly striking since it is well known that aqueous alkaline solutions of high molecular weight polymers containing carboxylic acid groups are extremely viscous. These materials are commonly used as thickening agents in order to take advantage of the extremely high viscosity, even at low total solids.

Another surprising aspect of this invention is the apparently unique character of the monoalkyl ester of itaconic acid. For example, when the itaconic acid ester is replaced with or is contaminated with as little as approximately 2% by weight of the isomeric monoalkyl ester of citraconic acid or mesaconic acid, a lower molecular weight polymeric material is formed which forms a cloudy yellow solution in alkali. On the other hand, when the itaconic acid ester is replaced with a monoalkyl ester of maleic acid or fumaric acid, the rate of emulsion polymerization is retarded and the molecular weight of the polymer is reduced. Even at this reduced molecular weight the copolymers of maleic acid half-esters and fumaric acid half-esters coagulate instead of dissolving in aqueous alkali.

As pointed out above, the polymers of this invention are produced by the aqueous emulsion copolymerization of a monoalkyl ester of itaconic acid and an alkyl ester of an alpha, beta-ethylenically unsaturated monocarboxylic acid. The monoalkyl esters of itaconic acid contain from 1 to 18 carbon atoms in the alkyl group and can be represented by the formula:

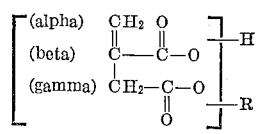

wherein R is a monovalent alkyl group of from 1 to 18 carbon atoms, such as methyl and stearyl. Preferably R is an unsubstituted alkyl group of from 4 to 8 carbon atoms, such as n-butyl, n-hexyl, n-octyl and 2-ethylhexyl. Other things being equal, coatings based on monoalkyl esters of itaconic acid having 4 or more carbon atoms in the alkyl group are considerably more resistant to removal by water (and other solvents) than coatings based on the lower monoalkyl esters of itaconic acid. Further, other things being equal, as the chain length of the alkyl increases the viscosity of the dissolved polymer in aqueous alkali decreases. Generally, when a lower alkyl ester of itaconic acid, such as the monomethyl ester, is employed it is desirable to employ it in conjunction with a higher monoalkyl ester of itaconic acid. While the above formula indicates that either the beta or gamma carboxyl group can be esterified, we have found that the best results have been obtained when at least 75% and preferably 90% of the gamma carboxyl groups have been esterified. When approximately only 50% of the gamma carboxyl groups have been esterified, the rate of copolymerization is slower and the viscosity behavior of the copolymer in aqueous alkali is decidedly poorer (at 25% total solids the polymeric solution appears to be somewhat hazy and the initial viscosity of the solution on dissolution is relatively higher).

While the monoalkyl itaconates can comprise from 5 to 50 mole percent of the polymerizable monomers, it is usually preferable to employ the monomer in a concentration of from about 8 to 20 mole percent. When the copolymer comprises less than about 8 to 10 mole percent monoalkyl itaconate, aqueous alkaline solutions of the copolymer tend to be turbid. Above about 20 mole percent, coatings based on the copolymers tend to become undesirably water-sensitive for many uses unless insolubilized by additional chemical reaction.

The alkyl esters of alpha, beta-ethylenically unsaturated monocarboxylic acids which comprise from about 40 to 95 mole percent of the monomeric units in the copolymers of this invention include "soft" monomers such as methyl acrylate, ethyl acrylate, isopropyl acrylate, butyl acrylate, amyl acrylate, hexyl acrylate, heptyl acrylate, 2-ethylhexyl acrylate, butyl methacrylate, amyl methacrylate, dodecyl methacrylate, etc. and "hard" monomers, such as methyl methacrylate, tert-butyl methacrylate, cyclohexyl acrylate, hydroxyethyl methacrylate, etc., which can be represented by the formula

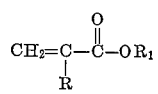

wherein R is methyl or hydrogen; when R is methyl, $R_1$ is an alkyl group of from 1 to 12 carbon atoms and when R is hydrogen, $R_1$ is an alkyl group of from 1 to 8 carbon atoms. The term "soft" is used herein in referring to polymers formed from the monomer alone, in the way that is common in this technology. (See Riddle, Acrylic Esters, Reinhold Publishing Co., 1954, pages 58 et seq.; also Patent No. 2,795,564). Generally, this refers to the "brittle-point" of the polymer, i.e., the temperature at which the polymer breaks on flexing. Polymers of the soft alkyl esters of alpha, beta-ethylenically unsaturated monocarboxylic acids of this invention have brittle points below about 20° C. while the hard esters have brittle points above about 20° C.

In general, the alkyl esters are soft monomers in the above formula when R is hydrogen (acrylic acid esters) and $R_1$ is a primary or secondary alkyl group of from 1 to 8 carbon atoms or when R is methyl methacrylic acid esters) and $R_1$ is a primary or secondary alkyl group of from 4 to 12 carbon atoms. On the other hand, the alkyl esters are hard monomers in the above formula when R is hydrogen and $R_1$ is a tertiary alkyl group or a cycloalkyl group or when R is methyl and $R_1$ is an alkyl group of from 1 to 3 carbon atoms, a tertiary alkyl group or a cycloalkyl group.

Various other dissimilar copolymerizable ethylenically unsaturated comonomers, such as styrene, vinylidene chloride, allyl alcohol, stearyl methacrylate, isoprene, dibutyl itaconate, etc., can comprise up to about 20 to 40 mole percent of the monomeric units in the copolymers of this invention. However, as explained below, this is usually not particularly advantageous.

While the copolymers of this invention can be composed solely of a monoalkyl ester of itaconic acid and a single alkyl ester of an alpha, beta-ethylenically unsaturated monocarboxylic acid, the preferred copolymers of this invention contain at least some soft alkyl ester of an alpha, beta-ethylenically unsaturated monocarboxylic acid and some hard alkyl ester of an alpha, beta-ethylenically unsaturated monocarboxylic acid in addition to the monoalkyl ester of itaconic acid in order to give the copolymers and coatings based thereon the proper balance of hardness, freedom from tack, gloss, flexibility, water resistance, etc. These copolymers usually and preferably contain from about 20 to 87 mole percent of a soft alkyl ester (preferably at least some ethylacrylate), from about 5 to 60 mole percent of a hard alkyl ester, and from about 8 to 20 mole percent of a monoalkyl ester of itaconic acid. Other things being equal, as the molar percentage of soft monomer decreases and of hard monomer increases, the copolymer varies from a soft, flexible, somewhat tacky coating material to a hard, tack free, glossy, relatively rigid material. Various products intermediate between these can be formed.

While all or part of the hard alkyl ester of alpha, beta-ethylenically unsaturated monocarboxylic acid in the above preferred 3-component copolymer can be replaced by other hard monomers, such as the monovinyl aromatics (e.g. vinyl toluene, styrene), dimethyl itaconate, acrylonitrile, vinyl chloride, vinylidene chloride, etc., this is usually not desirable. The hard alkyl esters of alpha, beta-ethylenically unsaturated monocarboxylic acids and particularly methyl methacrylate are preferred because they copolymerize more readily with the soft alkyl esters and the preferred monoalkyl esters of itaconic acid under emulsion polymerization conditions and because the resultant copolymer readily dissolves in aqueous alkali to form a water-thin, water-clear solution. Further, it has been found that a small amount of a hard methacrylate in a copolymer based upon a soft acrylate ester eliminates dilatancy which is a problem with copolymers composed solely of a soft acrylate and itaconic acid half-ester. On the other hand, copolymers containing as little as 10 mole percent monovinyl aromatic or vinylidene chloride units form low viscosity solutions in aqueous alkali, but they are turbid, when the preferred concentration of monoalkyl ester of itaconic acid is employed. Generally, as the concentration of oil soluble monomer, such as vinylidene chloride, styrene or isoprene, increases a correspondingly higher concentration of monoalkyl itaconate can be employed in order to minimize this turbidity. Copolymers with acrylonitrile tend to hydrolyze in alkali to form an undesirably yellowish solution with attendant increase in viscosity and water-sensitivity; further, acrylonitrile is very sluggish in its rate of emulsion polymerization with the essential monomers of this invention.

As can be seen from above, incorporating other comonomers in addition to the preferred combination (monoalkyl ester of itaconic acid, soft alkyl ester of alpha, beta-ethylenically unsaturated monocarboxylic acids and/or hard alkyl ester of alpha, beta-ethylenically unsaturated monocarboxylic acids), frequently detracts from the principal advantages of the preferred combination. Some comonomers can be used only in small quantities without seriously affecting the most desirable results obtained with the preferred combination. For example, monoalkyl maleates and monoalkyl fumarates do not polymerize readily under these conditions (some of these monomers are even more sluggish than acrylonitrile); copolymers containing a substantial molar percentage of vinyl acetate units, and coatings based thereon, are often extremely water-sensitive because the acetate groups tend to be hydrolyzed at a pH about about 8; copolymers containing more than 2 or 3 mole percent methacrylic acid or acrylic acid units are considerably more viscous in aqueous alkaline solutions and the polymer itself and coatings based thereon are often water-sensitive.

On the other hand, some of the dialkyl itaconates can be used advantageously. When water-insoluble, solid monobutyl itaconate is employed in this invention, the addition of a small amount of dibutyl itaconate to the monobutyl itaconate (a solid) yields a liquid, more easily handled composition. Other things being equal, the dibutyl itaconate has no ascertainable undesirable side effects on the copolymers of this invention and usually enhances the uniformity of the copolymer itself. Dimethyl itaconate while somewhat slower in its rate of polymerization than methyl methacrylate does not have the undesirable turbidity effect of the oil soluble monomers. Further, its use also cures the dilatancy problem associated with the soft acrylate-itaconic acid half-ester copolymers.

The table following summarizes the permissible and preferred mole percent of the copolymerizable monomers, the total being 100%.

|  | Preferred | Permissible |
|---|---|---|
| Alkyl ester [1] | 80–92 | 40–95 |
| Soft alkyl ester [1] | 20–87 | 0–95 |
| Hard alkyl ester [1] | 5–60 | 0–95 |
| Alkyl half-ester of itaconic acid | 8–20 | 5–50 |
| Dissimilar ethylenically unsaturated monomer | ([2]) | 0–40 |

[1] Of an alpha, beta-ethylenically unsaturated monocarboxylic acid.
[2] Minor quantities.

It is understood that while the above table sets forth the preferred and permissible molar concentrations of the various monomeric materials making up the copolymers of this invention, many compositions falling outside the preferred range form very desirable alkali soluble, high molecular weight copolymers within the permissible range.

Briefly, the aqueous emulsion copolymers of this invention are prepared by forming an aqueous emulsion, adding the monomers to be polymerized and catalysts to the emulsion, followed by polymerizing said monomers.

The emulsifiers, which have been found useful for dispersal or emulsification of the monomer may be chosen from a wide variety of anionic and nonionic surface active agents. Two or more surface active agents are frequently used of one or both types, and it is preferred to use both an anionic and a nonionic in combination. The preferred nonionic surface active agents (alkylphenoxy-polyoxyethylene ethanols) are composed of a hydrophobic hydrocarbon portion and a hydrophilic portion. The latter is a chain of 2–120 oxyethylene units while the former has an alkyl group of 4–18 carbon atoms which may be linked to the oxyethylene chain through a phenoxy group. Generally speaking, as the average length of the hydrocarbon chain in the monomer mixture increases, nonionic surface active agents of reduced number of oxyethylene groups should be used, i.e., those of greater oil solubility. Anionic surface active agents are also useful, and it is preferred to include both varieties in the emulsion. The anionic surface active agents normally have a hydrophilic anion and a hydrophobic cation. The same principles guide the selection of the anionic surface active agent. Typical of these useful anionic surface active agents are ammonium or alkali metal (e.g., sodium) salts of alkyl (e.g., lauryl) ether sulfate, ammonium or alkali metal salts of alkyl phenoxy polyoxyethylene ethanol sulfate esters (and similar polyoxyethylene derivatives), tetra sodium salt of N-(1,2-dicarboxyethyl N-octadecyl sulfosuccinamate (Aerosol 22), alkali metal and ammonium salts of polyelectrolytes, sodium alkyl (e.g., lauryl) sulfate, etc. In large measure, the selection of surface active agent (or agents) for the present copolymers is the same as for prior art emulsion polymerization.

The amount of surface active agent (or agents) required varies primarily with the concentration of monomers to be handled and to a minor extent with the choice of emulsifier, monomers, proportions of monomers and catalysts. Generally, the amount of surface active agent is betwen 1% and 12% of the total monomer weight and preferably between 1% and 4%. Somewhat the same principles apply in the selection of the amount as is the selection of the surface active agent itself. The proportion must be sufficient to impart the necessary stability, desired rate of polymerization, and particle size.

As polymerization catalysts, there may be used one or more of the peroxidic compounds better known to act as free radical catalysts which have at least some solubility in aqueous solutions of the emulsifier or which are soluble only in the monomer phase. Among the useful catalysts for the present type of copolymerization are the persulfates, including ammonium, sodium and potassium salts, hydrogen peroxide, and the perborates. Also useful are the organic peroxides and hydroperoxides. These include benzoyl peroxide, tertiary butyl hydroperoxide, diisopropyl benzene hydroperoxide, cumene hydroperoxide, caproyl peroxide, methylethyl ketone peroxide, etc. Other free-radical catalysts are also useful, such as azodiisobutyronitrile and other aliphatic azo compounds of the type having an acylic azo group and an aliphatic carbon atom on each nitrogen, at least one of which is tertiary. In part, the particular combination of monomers governs the selection of the inorganic or organic peroxide catalysts since some monomers respond better to one variety than they do to another.

The amount of peroxidic catalysts required is about proportional to the concentration of monomers used. The usual range is 0.01% to 3% of catalysts with reference to the weight of the monomer mixture. The preferred range is from 0.10 to 1.0% while the range of 0.4–0.8% is usually best. The optimum amount of catalysts is determined in large part by the nature of the particular monomers selected, including impurities which accompany particular monomers.

Frequently, a promoter for the catalysts (sometimes called an "accelerator" or "adjuvant") is used to hasten the reaction at a sufficiently low temperature to avoid coagulation. The promoter may be a reducing agent and together with the peroxidic catalysts is frequently referred to as a "redox system." Many examples of such systems are known and the promoters include ascorbic acid, and soluble sulfites, hydrosulfites, sulfoxalates, thiosulfates, and bisulfites. Particular promoters are exemplified by sodium hydrosulfite, sodium metabisulfites, zinc or sodium formaldehyde sulfoxalate, and calcium bisulfite. Polyvalent metal ions are also used in small concentrations, particularly ferrous ion in the form of ferrous ammonium sulfate at concentrations of a few parts of ferrous ion per million.

The amount of promoter required varies, as is known, with the free-radical initiator chosen and with a particular promoter. The emulsifying agent also affects somewhat the amount used as does the particular monomers. At the outside, not more than 3% or less than 0.01% is used in these situations. The preferred range of ascorbic acid is at the low end of this range up to about 0.5% while sulfites are used preferably in an amount of 0.2% to 1%.

Chain transfer agents, such as octyl mercaptan, dodecyl mercaptan and carbon tetrachloride can be used to regulate the molecular weight and/or the flow characteristics of the copolymer.

Copolymerization is best effected below about 95° C. The preferred range is 30° to 70° C., although slightly lower (0° C.) temperatures are permissible. After most of the monomers have been converted to copolymer, temperatures even higher than 95° may then be applied. In fact, after most of the monomers have copolymerized, the resulting emulsion copolymer system can be heated to boiling without breaking the emulsion. However, even if the emulsion breaks, this is not serious because the copolymer is later dissolved and breaking the emulsion does not affect the solution characteristics. During copolymerization the temperature can be controlled in part by the rate at which monomers are supplied and polymerized and/or by applied cooling.

The polymerization process can be carried out batchwise or continuously. It is possible to work entirely batchwise, emulsifying the entire charge of monomers and proceeding with polymerization. It is usually advantageous, however, to start with part of the monomers which are to be used and add more monomer or monomers as polymerization proceeds. An advantage of gradual addition of monomers lies in reaching a high solids content with optimum control and with maximum uniformity of product. Additional catalysts or additional components of the redox system may be added as polymerization proceeds, and these can be used to control the speed of reaction to avoid overheating.

A convenient method of carrying out the polymerization utilizing the preceding principles comprises preparing separate premixtures as follows: (I) a catalyst-emulsifier premixture; (II) a first monomer premixture which contains from 5 to 60 weight percent of the monomers to be polymerized; (III) a second monomer premixture which contains the balance of the monomers to be polymerized. In this method of performing the reaction, the catalyst-emulsifier premixture is preferably prepared in warm water (30–50° C.). To this, the first monomer premixture is added and the polymerization is initiated. After the reaction becomes exothermic, the second monomer premixture is added over a time sufficient to permit the temperature to be controlled throughout the reaction. Additional catalyst and/or promoter is added when necessary to maintain the reaction. Finally, the reaction is permitted or forced to go to completion, which is ensured (1) by raising the temperature to about 185° C. and/or (2) by the addition of additional catalyst and/or promoter.

The resulting acidic emulsion copolymers of this invention can be partially neutralized with alkali or dissolved in alkali. Suitable basic compounds include alkali metal hydroxides such as sodium hydroxide and potassium hydroxide; ammonium hydroxide; amines such as methyl amine, diethyl amine, triethanol amine, tetramethyl ammonium hydroxide; etc. The copolymers may be shipped in the unneutralized form or as partially neutralized emulsion or as an aqueous alkaline solution to the user or they can be formulated with other ingredients of a coating composition immediately after the copolymerization and shipped as such.

In the discussion which follows, reference is made to "clear point," "threshold pH" and "threshold concentration." The term "clear point" refers to the pH at which an emulsion copolymer of this invention dissolves to form a clear solution. The term "threshold pH" refers to the pH at which an alkaline solution of the copolymer, at a predetermined concentration, forms a viscous polymeric solution. The threshold pH is above the clear point pH of the polymer. However, as the concentration of the polymer increases, the threshold pH decreases and approaches the clear point pH. The "threshold concentration" refers to the concentration of emulsion copolymer necessary to form a viscous polymeric solution at a predetermined pH.

In greater detail, the resulting emulsion copolymers of this invention can be dissolved in alakli, and at a pH in the range of about 7.2–8.0, they form water-thin clear solutions (clear point pH) or at a higher pH (above the clear point) they are clear solutions which vary from water-thin to viscous. The viscosity behavior of an individual polymeric solution (i.e. above the clear point pH)

is dependent principally upon (1) the concentration of the copolymer in the aqueous solution, (2) the pH of the aqueous solution, (3) the age of the polymeric solution, (4) the alkali employed to establish the pH of the solution and (5) the concentration and particular monomers from which the copolymer was prepared. The initial viscosity of the polymeric solutions of this invention just after pH adjustment is dependent primarily upon a combination of factors 1 and 2. The precise pH of the clear point is also dependent to a minor extent on the factors that determine the viscosity behavior.

As the total solids concentration of the polymeric constituent of the polymeric solution increases past a threshold concentration, which is relatively independent of factors 4 and 5, but dependent upon factor 2, the initial viscosity of the solution increases precipitously by a multiple of 10, 100, or even 1000. Likewise, as the pH of the aqueous system in which the emulsion polymer is dissolved increases past a threshold pH, the viscosity of the initial solution increases precipitously; this threshold pH is relatively independent of factors 4 and 5 but dependent upon factor 1. In other words, the emulsion polymers of this invention can be dissolved in alkali to form water-thin clear polymeric solutions either by maintaining the pH of the aqueous solution below the threshold pH for the selected concentration of emulsion polymer or by maintaining the concentration of the emulsion polymer below the threshold concentration for the selected pH of the aqueous solution.

The threshold pH and/or threshold polymeric concentration can be readily determined for each individual polymeric system by simple experimentation utilizing the aforementioned principles. To illustrate further, aqueous alkaline solutions of emulsion polymers are clear, water-thin solutions under any of these conditions: (A) at the clear point pH, (B) at any alkaline pH above the clear point with a total solids concentration of 10% by weight, or (C) at a total solids concentration of up to and including about 20% by weight and a pH up to about 12. Above about 23% to 25% total solids the maximum pH at which solutions of copolymers of this invention have a low viscosity is about 9. As the total solids concentration of the polymeric solution increases from about 25% to 30% the pH range between the clear point and the threshold pH becomes exceedingly small. At 30% total solids, this pH range may be as small as 0.1 to 0.3 of a pH unit. Accordingly, the practical upper concentration of the aqueous alkaline solutions of this invention is about 30–35% by weight total solids.

The viscosity of the water-thin polymeric solutions is stable after aging for extended periods of time. However, the viscosity of the more viscous polymeric solutions, prepared at or above the threshold pH or the threshold concentration, drops during the first 24 hours after the polymer solution is prepared and then is stable. Generally the polymeric solutions prepared at just over the threshold pH or threshold concentration assume a water-thin viscosity after aging. This is believed to be due mainly to orientation of the polymeric chains although partial neutralization of the polymeric solution resulting from (A) evaporation of a volatile alkali (morpholine or ammonia) or (B) absorption of carbon dioxide from the air by non-volatile alkali (sodium hydroxide and potassium hydroxide) may contribute. Polymeric solutions prepared substantially above the threshold pH or threshold concentration reach a stable viscosity of a relatively high value. For example, a 25% by weight polymeric solution, which was prepared at a pH of 8.2 in aqueous ammonium hydroxide, had an initial viscosity of 15,000 cps., and this dropped to about 2,000 cps. after 6 hours and to about 300 cps. after 24 hours. However, a 25% by weight polymeric solution of the same polymer, which was prepared at a pH of 9.15 in aqueous ammonium hydroxide, had an initial viscosity of about 100,000 cps., and this dropped to about 15,000 cps. after one day and was still 13,000 cps. after four months.

In general, volatile alkali, such as ammonium hydroxide and morpholine, are used in preference to non-volatile alkali, such as sodium hydroxide and potassium hydroxide, for establishing the pH of the polymeric solutions of this invention since coatings cast from solutions of volatile alkali have much better water resistance than coatings cast from non-volatile alkali. Usually morpholine is not employed to establish the pH of a polymeric solution having more than about a 25% by weight total solids concentration unless a highly viscous polymeric solution is desired. There are no such restrictions in the use of ammonium hydroxide, sodium hydroxide or potassium hydroxide. If too much alkali has been used to establish the pH of the polymeric solutions resulting in undesirably high viscosity, the viscosity can be regulated by partial neutralization with acid or by the addition of formaldehyde to ammoniacal solutions.

As mentioned above, the monomers employed to produce the polymers of this invention influence the viscosity characteristics of the polymeric solution of this invention. For example, it has been found that when a portion of the preferred monoalkyl esters of itaconic acid having from about 4 to 8 carbon atoms in the alkyl group is replaced with a lower monoalkyl itaconate preferably monomethyl itaconate, the higher viscosity polymeric solutions are relatively viscosity stable on aging. On the other hand, when the more readily hydrolyzable methyl acrylate is employed as a comonomer the polymeric solutions are preferably maintained at a pH below about 9 or 9.5 in order to prevent the methyl acrylate from hydrolyzing. On hydrolysis, the viscosity of the polymeric solution increases. The higher alkyl acrylates (2–8 carbon atoms) and all the methacrylates are considerably more resistant to hydrolysis than methyl acrylate. For the above reasons, copolymers containing the more readily hydrolyzable monomers such as vinyl acetate and acrylonitrile are preferably maintained at a pH below about 8 and those containing methyl acrylate below about 9 to 9.5.

The copolymers of this invention can be employed in a wide variety of coating uses such as in water-based paints, in floor polishes, in metal coating compositions, in the adhesive portion of pressure sensitive tapes, or as a release coating for pressure sensitive tapes, in textile coating compositions, in paper coating compositions, in leather finishing compositions, in aerosol hairsprays, etc., where the concentration of the copolymer can range from the major or even sole ingredient (exclusive of water) to a minor component of the coating compositions. The uses include coating metal substrates, cellulosic substrates, masonry substrates, synthetic substrates, etc.

Generally in formulating a paint based upon the copolymers of this invention as the sole or primary vehicle, the emulsion copolymer is dissolved in alkali (to a pH below 10 and preferably between 8.0 and 9.5) with ammonia preferably, although a water-soluble amine or an alkali metal hydroxide may be used at least in part. The aqueous polymeric solution is then mixed with dispersed pigments, coalescing agents, and other paint ingredients to produce the paint properties desired. The compounded paints have exhibited outstanding levelling, gloss, mar resistance and adhesion on various types of substrates. The relatively high mole percent of itaconic acid half-ester moieties (potentially free carboxyl groups) aids in adhesion of such paints to masonry and metal surfaces. Small amounts of calcium, zinc or magnesium ions on the masonry surface tend to insolubilize the coating by reacting with the carboxyl group, while the carboxyl groups have a natural affinity for metal surfaces.

In general, the addition of the copolymers of this invention to prior aqueous emulsion polymers upgrades paints based upon these polymers by improving levelling, gloss, abrasion resistance and in some cases even water-resistance. Acrylate latices, styrene-acrylate latices, styrene latices and styrene-butadiene latices have all been improved in this manner. Likewise, it has been found that emulsion copolymers which have been polymerized in the presence of the copolymers of this invention have enhanced properties as paint vehicles. In particular, low cost latex paints based upon styrene polymerized in the presence of the copolymers of this invention (in their emulsion form) have considerably better properties than conventional latex paints containing polystyrene.

In formulating a floor polish for resilient flooring (preferably of a non-porous type), where the copolymer of this invention is the primary vehicle, the emulsion copolymer is dissolved in a volatile alkali (preferably ammonia or morpholine) to a pH of about 8 to 10. The aqueous polymeric solution is then mixed with a wax, coalescing agents and other floor polish ingredients.

The copolymers have also been employed as a minor component (up to about 20 dry weight percent) in conventional floor polishes based on polymers of styrene and/or acrylates in order to replace the conventional alkali soluble resins and/or shellac employed in these formulations. The copolymers of this invention are particularly useful in upgrading floor polishes based upon polystyrene, the styrene being polymerized in the presence of the copolymers of this invention (in the solution form).

As indicated earlier, the polymers of this invention have good adhesion to metal surfaces, such as aluminum, steel, zinc, etc., due to the affinity of the carboxyl groups of the itaconate half-ester moieties for metal surfaces. In some cases, it may be desirable to apply a thin so-called "monomolecular" layer of the copolymer to the metal surface in order to take advantage of the hydrophilic properties of the coating and in other cases it may be desirable to apply a clear or slightly pigmented protective and/or decorative coating. In the former case, the monomolecular copolymer layer can function as the hydrophilic subbing layer for the light sensitive portion of a lithographic printing plate, or it may be applied in place of gum arabic or polyacrylic acid to an imaged plate immediately after development and/or from the printing fountain solution.

In the case where the coating is protective and/or decorative, the copolymer may be applied in thicker layers with or without potential cross-linking agents to improve the alkali resistance of the coating. Typical cross-linking agents of this type include three membered ring compounds, such as epoxy compounds and/or resins; aziridine compounds and thiiran compounds; materials based on formaldehyde such as methylol compounds and melamineformaldehyde resins; complexed polyvalent metal salts, etc. The operation and use of some of these systems is discussed in somewhat greater detail in the examples. These coatings, whether cross-linked or not, have high integrity, strength, flexibility, clarity, gloss and abrasion resistance.

The polymeric solutions of this invention have a variety of uses in textile coatings. These uses include warp sizing, protective coating, pigment binders, non-woven binders, finishes, etc. These polymeric solutions are particularly useful for warp sizing because of their extremely low BOD and the ease with which the sizing can be removed in alkaline de-sizing baths. In some cases, it may be desirable to apply them in the emulsion form. They may be used as the sole warp sizing agent or added (in the emulsion form or solution form) to numerous latices, such as acrylate, acrylate-styrene, styrene and butadiene-styrene, in order to enhance the sizing and de-sizing properties of the latices. They may also be used in conjunction with starch and carboxymethyl cellulose sizes. Generally, the more permanent finishes require the presence of a cross-linking agent.

The polymer compositions of this invention are also useful in paper coatings. Laboratory printability tests, as measured on an I.G.T. Printability Tester, indicate that pigmented paper coatings containing the copolymers of this invention as the sole pigment adhesive are superior to similar coatings made with higher adhesive levels of acrylic emulsion binders, starch binders, protein binders, etc. When employed as the sole adhesive in such coatings, the copolymers of this invention can comprise from about 5 to 30 parts per 100 parts of mineral pigment (clay, titanium dioxide, etc.). If desired, concentrations as low as 1 or 2 parts per 100 parts of mineral pigment can be used where the copolymer of this invention replaces part of the conventional pigment binder such as starch, acrylic copolymers, vinyl acetate latices, butadiene-styrene latices, casein, soybean protein, etc. The conventional pigment binder may be considered a diluent of the copolymer of this invention. Coating colors have also been prepared with the emulsion copolymers of this invention in the emulsion form at a pH of 5.5 to 6.

These copolymers can also be used in the paper industry as wet-end additives, internal or external wet-strength additives, surface sizing agents, binders and finishes for non-woven fabrics, laminating adhesives, etc.

Figure 2:
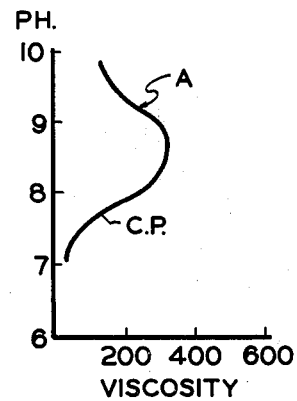
Figure 3:
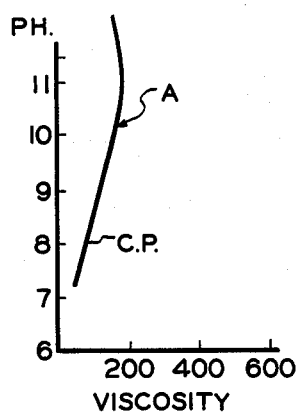
Figure 4:
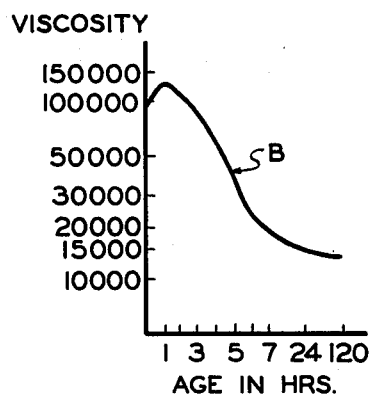
Figure 5:
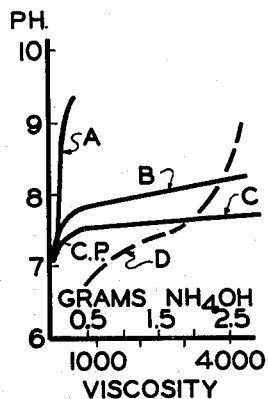
Figure 6:
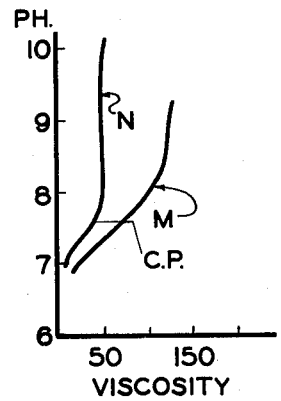
Figure 7:
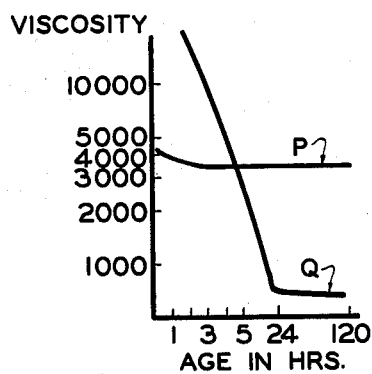
Figure 8:
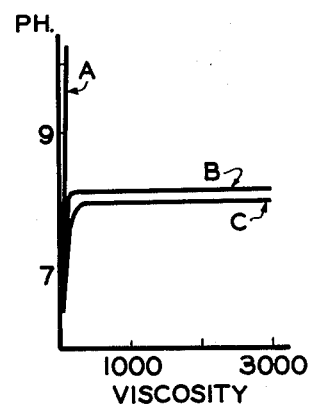
Figure 9:
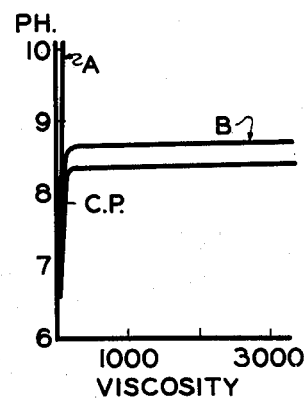
Figure 10:
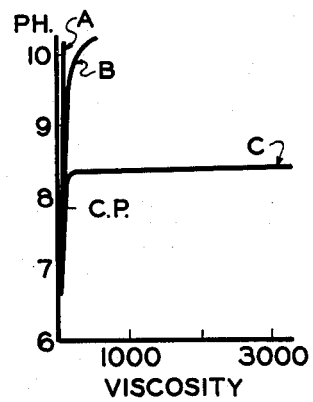

The drawings serve to illustrate the solution characteristics of the copolymers of this invention, the drawings which are graphs are:

FIGURE 1, illustrating the characteristics of aqueous ammoniacal solutions of the copolymer of Example i;

FIGURE 2, illustrating the solution characteristics of the copolymer of Example 1 in aqueous morpholine;

FIGURE 3, illustrating the solution characteristics of the copolymer of Example 1 in aqueous sodium hydroxide;

FIGURE 4, illustrating the solution characteristics of an aqueous ammoniacal solution of the copolymer of Example I on aging for 120 hours;

FIGURE 5, illustrating the solution characteristics of aqueous ammoniacal solutions of the copolymer of Example II;

FIGURE 6, illustrating the solution characteristics of the copolymer of Example III in aqueous morpholine and in aqueous sodium hydroxide;

FIGURE 7, illustrating the solution characteristics of aqueous ammoniacal solutions of the copolymers of Examples II and III on aging for 120 hours;

FIGURE 8, illustrating the solution characteristics of aqueous ammoniacal solutions of the copolymer of Example III;

FIGURE 9, illustrating the solution characteristics of aqueous ammoniacal solutions of the copolymer of Example VI; and FIGURE 10, illustrating the solution characteristics of aqueous ammoniacal solutions of the copolymer of Example VII.

Referring more particularly to the drawings, the viscosity of the polymeric solutions in centipoises is plotted against the pH of the solution in FIGURES 1–3, 5, 6 and 8–10, and the viscosity of the polymeric solutions in centipoises is plotted against the age of the solutions in hours in FIGURES 4 and 7. In the figures C.P. stands for the clear point of the polymeric solution, A stands for a 20% by weight total solids solution, B stands for a 25% by weight total solids solution and C stands for a 30% by weight total solids solution. In FIGURE 6, M stands for a 20% by weight total solids solution in morpholine and N stands for a 20% by weight total solids solution in sodium hydroxide. In FIGURE 8, P stands for a 25% by weight total solids aqueous ammoniacal solution of the copolymer of Example II at a pH of 7.8 aged for 120 hours and Q stands for a 25% by weight total solids aqueous ammoniacal solution of the copolymer of Example III at a pH of 8.2 aged for 120 hours.

The following examples are merely illustrative and should not be construed as limiting the scope of the invention. In the examples which follow, the word "parts" refers to parts by weight. The viscosity of the various copolymers were measured in a Brookfield Viscometer using a #2 spindle.

EXAMPLE I

The following premixtures were prepared to be used in the preparation of a preferred copolymer of this invention.

| | Parts (dry weight) |
|---|---|
| Catalyst-emulsifier premixture: | |
|   Duponol WAQE | 1.8 |
|   Tergitol NPX | 1.2 |
|   Tertiary butyl hydroperoxide | 0.6 |
|   Water | 170 |
| First monomer premixture: | |
|   Monobutyl itaconate [1] | 5.4 |
|   Ethyl acrylate | 15.6 |
|   Methyl methacrylate | 9.0 |
|   Tertiary dodecyl mercaptan | 0.12 |
| Second monomer premixture: | |
|   Monobutyl itaconate | 12.6 |
|   Ethyl acrylate | 36.4 |
|   Methyl methacrylate | 21.0 |
|   Tertiary dodecyl mercaptan | 0.28 |
| Promoter: | |
|   Ascorbic acid | 0.25 |
|   Water | 10 |
| Additional catalyst: Tertiary butyl hydroperoxide | 0.15 |

[1] The monobutyl itaconate used in this example and in the examples to follow has approximately 90% of the gamma carboxyl groups esterified. Unless specified the monoalkyl itaconate in the examples has this ratio of beta and gamma carboxyl groups.

Six parts (1.8 parts dry weight) of aqueous Duponol WAQE (sodium salt of technical lauryl alcohol sulfate) and 1.2 parts dry weight of Tergitol NPX (nonylphenyl ether of polyethylene glycol) were dissolved at 30° C. in 170 parts water in a suitable glass-lined reactor fitted with a stirrer, jacket and nitrogen inlet tube. After the reactor was purged with nitrogen gas 0.60 part of tertiary butyl hydroperoxide and 2.5 parts (0.0625 part dry weight) of an aqueous solution of ascorbic acid were added. The first monomer premixture was then added to the reactor. After the reaction was initiated, which was indicated by a 1 to 2° C. rise in temperature, the second monomer premixture and the remaining ascorbic acid was added gradually over a period of about 1 hour and 2 hours respectively. After all of the second monomer premixture was added, the additional catalyst was added and the temperature of the reactor was held at about 70–75° C. until the polymerization was complete. The emulsion (36% by weight total solids) was then cooled to room temperature. The copolymer contained 10.6 mole percent monobutyl itaconate, 56.7 mole percent ethyl acrylate and 32.7 mole percent methyl methacrylate.

A low viscosity 25% by weight total solids ammoniacal solution was prepared from the above aqueous emulsion copolymer by slowly adding 1.5 parts 26° Bé. ammonium hydroxide, which was diluted with 7.5 parts water, to 100 parts of the above emulsion copolymer, which had previously been diluted with 35 parts water. The composition was stirred vigorously until clear. A series of 20%, 25% and 30% by weight total solids aqueous ammoniacal solution was prepared at various pHs in the same manner. The results are set forth in FIGURE 1 where the 20% solution is represented by curve A, the 25% solution is represented by curve B and the 30% solution is represented by curve C. The data indicate that the emulsion copolymer of this example (1) has a clear point at a pH of approximately 7.8 in an ammoniacal solution, (2) as the total solids of the polymeric solution increases the threshold pH of the solution decreases and (3) that the viscosity of a 20% by weight total solids solution is below 300 cps. independently of pH.

A low viscosity 20% by weight total solids solution was prepared from the above aqueous emulsion copolymer by slowly adding 4.0 parts of morpholine, which was diluted with 76 parts water to 100 parts of the above emulsion copolymer. The composition was stirred vigorously until clear. A series of solutions in aqueous morpholine was prepared at various pHs in the same manner. The results are set forth in FIGURE 2, which indicates that the emulsion copolymer of this example (1) has a clear point at a pH of about 7.8 in aqueous morpholine and (2) that the viscosity of a 20% by weight total solids solution is below 400 cps. independently of pH.

A low viscosity 20% by weight total solids solution was prepared from the above aqueous emulsion copolymer by slowly adding 86 parts aqueous sodium hydroxide (1.25 parts dry weight) to 100 parts of the above emulsion copolymer. The composition was stirred vigorously until clear. A series of solutions were prepared at various pHs in the same manner. The results are set forth in FIGURE 3, which indicates that the emulsion copolymer of this example (1) has a clear point at a pH of about 8 in aqueous sodium hydroxide and (2) that the viscosity of a 20% by weight total solids solution is below 300 cps. independently of pH.

An aqueous 25% by weight total solids ammoniacal solution of the above emulsion copolymer was prepared at a pH of 9.15, which was above the threshold pH for this copolymer. FIGURE 4 indicates that the copolymer of this example can be dissolved in aqueous ammonium hydroxide to form a highly viscous ammoniacal solution by suitably regulating the pH and total solids of the aqueous system. On aging the viscosity of the polymeric solution drops off sharply during the first 24 hours before the polymeric solution assumes a stable viscosity.

A 20% by weight aqueous solution was prepared by dissolving 100 parts of the emulsion copolymer (36 parts dry weight) of this example in 100 parts of water containing 4 parts diethanolamine. The solution had a pH of 8.8 and a viscosity less than 100 cps.

A 20% by weight aqueous solution was prepared by dissolving 100 parts of the emulsion copolymer (36 parts dry weight) of this example in 75 parts of water containing 3 parts monoethanolamine. The solution had a pH of 9.6 and a viscosity less than 100 cps.

EXAMPLE II

The following premixtures were prepared to be used in the preparation of a preferred viscosity stable copolymer of this invention.

| | Parts (dry weight) |
|---|---|
| Catalyst-emulsifier premixture: | |
|   Duponol WAQE | 1.8 |
|   Tergitol NPX | 1.2 |
|   Tertiary butyl hydroperoxide | 0.6 |
|   Tertiary dodecyl mercaptan | 0.6 |
|   Water | 165 |
| First monomer premixture: | |
|   Monobutyl itaconate | 3.6 |
|   Monomethyl itaconate | 0.4 |
|   Ethyl acrylate | 3.0 |
|   Methyl methacrylate | 3.0 |
|   Methyl acrylate | 10.0 |
| Second monomer premixture: | |
|   Monobutyl itaconate | 14.4 |
|   Monomethyl itaconate | 1.6 |
|   Ethyl acrylate | 12.0 |
|   Methyl methacrylate | 12.0 |
|   Methyl acrylate | 40.0 |
| Promoter: | |
|   Ascorbic acid | 0.12 |
|   Water | 10 |
| Additional emulsifier: Triton X–200 | 0.40 |

Six parts (1.8 parts dry weight) of Duponol WAQE, 1.2 parts dry weight Tergitol NPX, 0.6 part tertiary butyl hydroperoxide and 0.6 part tertiary dodecyl mercaptan were dissolved at 30° C. in 165 parts water in a suitable glass-lined reactor. The first monomer premixture was added to the reactor and then 0.036 part (dry weight) of ascorbic acid was added. The second monomer premixture and the remaining ascorbic acid were added over a period of 1 hour after the initial reaction became exothermic, while maintaining the reaction temperature at about 70° C. Shortly before the end of the second monomer addition, 0.40 part dry weight of Triton X–200 (alkylaryl polyether sodium sulfonate) was added to the reactor. After the polymerization was complete, the emulsion (36% by weight total solids solution) was cooled to room temperature. The copolymer contained 9.7 mole percent monobutyl itaconate, 1.4 mole percent monomethyl itaconate, 15.1 mole percent ethyl acrylate, 15.1 percent methyl methacrylate and 58.6 mole percent methyl acrylate.

A series of 20%, 25% and 30% by weight total solids aqueous ammoniacal solutions were prepared in the manner described in Example I. The results are set forth in FIGURE 5 where curve A represents the 20% solution, curve B represents the 25% solution and curve C represents the 30% solutions. The data indicate that the emulsion copolymer of this example (1) has a clear point at a pH of approximately 7.3 in an ammoniacal solution, (2) as the total solids of the polymeric solution increases the threshold pH of the solution decreases and (3) that the viscosity of a 20% by weight total solids solution is below 1000 cps. independently of pH.

A series of 20% by weight total solids aqueous solutions were prepared in aqueous sodium hydroxide and in aqueous morpholine. The results are set forth in FIGURE 6 where curve N represents the sodium hydroxide solution and curve M represents the morpholine solution. The data indicate that the emulsion copolymer of this example (1) has a clear point at a pH of approximately 7.5 in aqueous sodium hydroxide (2) has a clear point at a pH of approximately 7.5 in aqueous morpholine and (3) that the viscosity of a 20% by weight total solids solution is below 150 cps. in either aqueous sodium hydroxide or aqueous morpholine independently of pH.

EXAMPLE III

Another preferred copolymer of this invention was prepared by the polymerization technique of Example II using the emulsifier catalyst system of that example except that the monomer premixtures were as follows:

First monomer premixture: Parts
    Monobutyl itaconate _____ 5.4
    Ethyl acrylate _____ 18.6
    Methyl methacrylate _____ 6.0
Second monomer premixture:
    Monobutyl itaconate _____ 12.6
    Ethyl acrylate _____ 43.4
    Methyl methacrylate _____ 14.0

The resulting emulsion copolymer, which contained 10.6 mole percent monobutyl itaconate, 67.6 mole percent ethyl acrylate and 21.8 mole percent methyl methacrylate, was dissolved in aqueous ammoniacal solutions as described in Example I. The results, which were essentially the same as with the copolymer of Example I, are set forth in FIGURE 8.

Aqueous solutions of the above emulsion copolymer were prepared at 10% and 20% by weight total solids in aqueous sodium hydroxide and aqueous morpholine at pH's up to about 10. All of the solutions had viscosities below 300 cps.

An aqueous 25% ammoniacal solution of the copolymer of Example II was prepared at a pH of 7.8 (approximately the threshold pH) and aged for 5 days. An aqueous 25% ammoniacal solution of the copolymer of Example III, which does not contain monomethyl itaconate was prepared at a pH of 8.2 and aged 5 days for comparison. FIGURE 7, where curve Q represents the copolymer of this example and curve P represents the copolymer of Example II, illustrates that the incorporation of monomethyl itaconate into the copolymer results in a relatively viscosity-stable polymer in contrast to the copolymer of Example III which was prepared at a higher pH. This is a particularly severe test of the internal viscosity stabilizing effect of the monomethyl itaconate, since polymeric solutions which do not contain a viscosity stabilizer, typical of which is the copolymer of Example III, prepared at the threshold pH or threshold concentration normally assume the same low viscosity after aging 24 hours as polymeric solutions prepared at the clear point.

EXAMPLE IV

This example illustrates that the monoalkyl itaconates of this invention cannot be replaced by monoalkyl esters of alpha, beta-ethylenically unsaturated alpha, beta-dicarboxylic acids. Example II was repeated using the following monomer premixtures.

First monomer premixture: Parts
    Monobutyl maleate _____ 6.0
    Ethyl acrylate _____ 18.0
    Methyl methacrylate _____ 6.0
Second monomer premixture:
    Monobutyl maleate _____ 14.0
    Ethyl acrylate _____ 42.0
    Methyl methacrylate _____ 14.0

The polymerization was quite sluggish and resulted in a very milky high coagulum (6%) emulsion quite different from the low coagulum (less than 0.5%) emulsions of the preceding examples. The copolymer which contained 12.7 mole percent monobutyl maleate, 65.5 mole percent ethyl acrylate and 21.8 mole percent methyl methacrylate, set up and coagulated almost completely when the copolymer at 25% by weight solids was neutralized with the same amount of ammonium hydroxide which was employed in Example III to dissolve the copolymer of Example III at its clear point. On the other hand, a 30% by weight total solids copolymer of Example III formed a water-thin (about 100 cps.) solution at the clear point. The above data emphasizes that the monoalkyl itaconates of this invention cannot be replaced by monoalkyl esters of alpha, beta-ethylenically unsaturated alpha, beta-dicarboxylic acids.

EXAMPLE V

This example illustrates that the monoalkyl itaconates of this invention cannot be replaced by an alpha, beta-ethylenically unsaturated monocarboxylic acid. Example II was repeated using 10 parts methacrylic acid, 70 parts ethyl acrylate and 20 parts methyl methacrylate. The copolymer, which contained 11.4 mole percent methacrylic acid, 68.9 mole percent ethyl acrylate and 19.7 mole percent methyl methacrylate, was dissolved in an ammoniacal solution at a pH of 7.75 to form a highly viscous (in excess of 100,000 cps.) cloudy solution at 25% by weight total solids. The viscosity of the polymeric solution did not decrease on aging. This was in direct contrast to the water-thin clear, higher total solids solutions of the copolymer of Example III at the same pH. This example clearly illustrates that the monoalkyl itaconates of this invention cannot be replaced by alpha, beta-ethylenically unsaturated monocarboxylic acids.

EXAMPLE VI

Another preferred copolymer of this invention was prepared by the polymerization technique of Example II except that the monomer premixtures were as follows:

First monomer premixture: Parts
    Monobutyl itaconate _____ 6.0
    Ethyl acrylate _____ 22.2
    Methyl methacrylate _____ 1.8
Second monomer premixture:
    Monobutyl itaconate _____ 14.0
    Ethyl acrylate _____ 51.8
    Methyl methacrylate _____ 4.2

The resulting emulsion copolymer, which contained 11.8 mole percent monobutyl itaconate, 81.6 mole percent ethyl acrylate and 6.6 mole percent methyl methacrylate, was dissolved in aqueous ammoniacal solutions as described in Example I. The results, which were essentially the same as in Example I, are set forth in FIGURE 9 where curve A represents the 20% by weight ammoniacal solution, curve B represents the 25% by weight ammoniacal solution and curve C represents the 30% by weight ammoniacal solution.

EXAMPLE VII

A copolymer having essentially the same film properties as the copolymer of Example VI was prepared using the method described in Example I, except that the monomer premixtures were as follows:

| First monomer premixture: | Parts |
|---|---|
| Monobutyl itaconate | 6.4 |
| Ethyl acrylate | 17.9 |
| Methyl methacrylate | 1.9 |
| Butyl acrylate | 5.7 |
| Second monomer premixture: | |
| Monobutyl itaconate | 13.6 |
| Ethyl acrylate | 38.1 |
| Methyl methacrylate | 4.1 |
| Butyl acrylate | 12.3 |

The resulting emulsion copolymer, which contained 12.3 mole percent monobutyl itaconate, 64.2 mole percent ethyl acrylate, 16.6 mole percent butyl acrylate and 6.9 mole percent methyl methacrylate, was dissolved in aqueous ammoniacal solutions as described in Example I. The results are set forth below in FIGURE 10. It will noted that the 20% by weight total solids polymeric solutions (Curve A) and 30% by weight total solids polymeric solutions (Curve C) behaved essentially the same as the polymeric solutions of Example VI, but the 25% by weight total solids polymeric solution (Curve B) of this example behaved more like the 20% by weight total solids polymeric solutions than any of the 25% by weight total solids polymeric solutions of the preceding examples.

EXAMPLE VIII

Each of the copolymers of Examples I–III, VI and VII were dissolved at about 20% by weight total solids in an ammoniacal solution and cast as a film. Each of the films was aged 72 hours at 77° F. and 50% relative humidity before testing. The results are set forth below in Table II.

*Table II*

| Property and test | I | II | III | VI | VII |
|---|---|---|---|---|---|
| Tensile strength in p.s.i.—ASTM: D882-56T | ¹ 3,080 | 3,250 | 1,790 | | |
| Elastic modulus in p.s.i.—ASTM: D882-56T | 206,500 | 380,000 | 145,000 | (250) | (250) |
| Percent elongation at break—ASTM: D882-56T | 130 | 110 | 200 | 800+ | 800+ |
| Sward hardness— Plate glass: 50 | 15 | 43 | 14 | 2.5 | 2.5 |
| Wet abrasion ²—Gardner wear tester | 600 | | 2,000+ | 125 | 125 |
| Dry abrasion ³— Taber abraser | 325 | 250+ | 200 | 125 | 125 |
| Gloss | 90 | 96 | 90 | 88 | 88 |

¹ A film cast from this copolymer in the emulsion form (at an acidic pH) had a tensile strength of 1,750 p.s.i.
² Cycles to 50% destruction of 0.002 inch film.
³ Cycles to 25% destruction of 0.003 inch film.

The above table indicates that by varying the monomer proportions of the copolymers of this invention, it is possible to prepare films varying considerably in physical properties. It might be noted that while methyl acrylate is considered a soft monomer for the purposes of this invention, it is considerably harder than ethyl acrylate and the various other soft acrylates. Accordingly, other things being equal, films based on copolymers having a high concentration of methyl acrylate have a higher tensile strength than those having the same concentration of ethylacrylate, etc.

EXAMPLE IX

This example illustrates the preparation of a copolymer having essentially the same aqueous alkaline solution properties and film properties as the copolymer of Example III except that the copolymer contains monomethyl itaconate which serves as a built-in viscosity stabilizer. The copolymer was prepared by the method of Example II using the following monomer premixtures.

| First monomer premixture: | Parts |
|---|---|
| Monobutyl itaconate | 2.8 |
| Monomethyl itaconate | 0.4 |
| Ethyl acrylate | 12.6 |
| Methyl methacrylate | 4.2 |
| Second monomer premixture: | |
| Monobutyl itaconate | 11.2 |
| Monomethyl itaconate | 1.6 |
| Ethyl acrylate | 50.4 |
| Methyl methacrylate | 16.8 |

The copolymer contained 8.1 mole percent monobutyl itaconate, 1.5 mole percent monmethyl itaconate, 67.8 mole percent ethyl acrylate and 22.6 mole percent methyl methacrylate. High viscosity polymeric solutions of this copolymer were stable in viscosity (decrease less than about 20% after aging 24 hours).

EXAMPLE X

This example illustrates the preparation of a copolymer having essentially the same aqueous alkaline solution properties and film properties as the copolymer of Example I except that the copolymer contains monomethyl itaconate which serves as a built-in viscosity stabilizer. The copolymer was prepared by the method of Example II using the following monomer premixtures.

| First monomer premixture: | Parts |
|---|---|
| Monobutyl itaconate | 2.8 |
| Monomethyl itaconate | 0.8 |
| Ethyl acrylate | 10.2 |
| Methyl methacrylate | 6.2 |
| Second monomer premixture: | |
| Monobutyl itaconate | 11.2 |
| Monomethyl itaconate | 3.2 |
| Ethyl acrylate | 40.8 |
| Methyl methacrylate | 24.8 |

The copolymer contained 8.1 mole percent monobutyl itaconate, 3.0 mole percent monomethyl itaconate, 55.3 mole percent ethyl acrylate and 33.6 mole percent methyl methacrylate. High viscosity polymeric solutions of this copolymer were stable in viscosity (decreased less than about 20% after aging 24 hours).

EXAMPLE XI

Example I was repeated using a monobutyl itaconate having approximately 50% of the gamma carboxyl groups and 50% of the beta carboxyl groups esterified. This mixed monobutyl itaconate was prepared by the transesterification of itaconic acid and dibutyl itaconate. The polymerization of these monomers was considerably slower than the polymerization in Example I and the resultant copolymer on dissolution in alkali was somewhat hazy. The initial viscosity on dissolution of the copolymer at 25% total solids in aqueous ammonia was also higher than the viscosity of the copolymer of Example I.

EXAMPLE XII

This example illustrates the preparation of a preferred copolymer of this invention using monohexyl itaconate.

The copolymer was prepared by the method of Example I using the following premixtures:

Emulsifier-catalyst premixture: Parts (dry)
- Duponol WAQE _____ 1.25
- Tergitol NPX _____ 1.25
- Dibenzoyl peroxide _____ 0.75
- Water _____ 170

First monomer premixture:
- Monohexyl itaconate _____ 7.5
- Ethyl acrylate _____ 15.0
- Methyl methacrylate _____ 7.5

Second monomer premixture:
- Monohexyl itaconate _____ 17.5
- Ethyl acrylate _____ 35.0
- Methyl methacrylate _____ 17.5

Promoter: ascorbic acid _____ 0.20

The resulting emulsion copolymer, which contained 13.5 mole percent monohexyl itaconate, 57.7 mole percent ethyl acrylate and 28.8 mole percent methyl methacrylate, was dissolved at 20% by weight total solids in ammonium hydroxide to form a clear, low viscosity, ammoniacal solution. Films cast from ammoniacal solution had better water resistance than films cast from copolymers containing the same mole concentration of monobutyl itaconate.

EXAMPLE XIII

This example illustrates the preparation of a copolymer of a monoalkyl itaconate and a single alkyl ester of an alpha, beta-ethylenically unsaturated monocarboxylic acid wherein the monoalkyl itaconate comprises in excess of 40 mole percent of the copolymer. The copolymer was prepared by the method of Example I except that the polymerization temperature was maintained below 35° C. The following concentration of reactants was employed.

Parts (dry weight)
- Monobutyl itaconate _____ 60
- Methyl acrylate _____ 40
- Duponol WAQE _____ 1.5
- Igepal CO-887 (nonylphenoxypolyoxyethylene glycol) _____ 1.50
- Water _____ 150
- Ascorbic acid _____ 0.15
- Tertiary butyl hydroperoxide _____ 0.30

The resulting emulsion copolymer, which contained 41.0 mole percent monobutyl itaconate and 59 mole percent methyl acrylate was dissolved at 20% by weight total solids in ammonium hydroxide to form a clear, low viscosity, ammoniacal solution.

EXAMPLE XIV

Example XIII was repeated using 50 parts monobutyl itaconate (31.6 mole percent) and 50 parts methyl acrylate (68.4 mole percent). The resulting emulsion copolymer was dissolved at 20% by weight total solids in ammonium hydroxide to form a clear, low viscosity, ammoniacal solution.

EXAMPLE XV

Example XIII was repeated using 30 parts mono-2-ethylhexyl itaconate (15.9 mole percent) and 70 parts ethyl acrylate (84.1 mole percent). The resulting emulsion copolymer was dissolved at 20% by weight total solids in ammonium hydroxide to form a slightly hazy, low viscosity, ammoniacal solution.

EXAMPLE XVI

Example XIII was repeated using 20 parts mono-2-ethylhexyl itaconate (9.9 mole percent) and 80 parts ethyl acrylate (90.1 mole percent). The resulting emulsion copolymer was dissolved at 20% by weight total solids in ammonium hydroxide to form a slightly hazy, low viscosity, ammoniacal solution.

EXAMPLE XVII

This example illustrates the preparation of a copolymer wherein the monalkyl itaconate comprises less than 6 mole percent of the copolymer. The copolymer was prepared by the method of Example I except that the tertiary butyl perbenzoate was added at the end of the polymerization. The following concentration of reactants was employed.

Parts (dry)
- Monobutyl itaconate _____ 10.0
- Ethyl acrylate _____ 88.0
- Allyl alcohol _____ 2.0
- Tergitol NPX _____ 0.2
- Duponol WAQE _____ 1.0
- Aerosol 22 _____ 1.0
- Igepal CO887 _____ 1.0
- Tertiary butyl hydroperoxide _____ 0.5
- Ascorbic acid _____ 0.25
- Tertiary butyl perbenzoate _____ 0.20
- Water _____ 150

The resulting emulsion copolymer, which contained 5.5 mole percent monobutyl itaconate, 4.3 mole percent allyl alcohol and 90.2 mole percent ethyl acrylate was dissolved at 20% by weight total solids in ammonium hydroxide to form a cloudy, low viscosity ammoniacal system, which was on the border line between an emulsion and a solution.

EXAMPLE XVIII

This example illustrates the preparation of a three component polymer, wherein dimethyl itaconate is employed as a hard monomer. The copolymer was prepared by the method of Example II using the following reactants.

Parts (dry)
- Monobutyl itaconate _____ 20
- Ethyl acrylate _____ 35
- Dimethyl itaconate _____ 45
- Tertiary dodecyl mercaptan _____ 0.6
- Tergitol NPX _____ 1.2
- Duponol WAQE _____ 1.8
- Triton X-200 _____ 0.4
- Tertiary butyl hydroperoxide _____ 0.75
- Ascorbic acid _____ 0.12
- Water _____ 180

The resulting emulsion copolymer, which contained 14.4 mole percent monobutyl itaconate, 47.2 mole percent ethyl acrylate and 38.4 mole percent dimethyl itaconate, was dissolved at 25% by weight total solids in ammonium hydroxide to form a clear, low viscosity solution.

EXAMPLE XIX

This example illustrates the preparation of a three component polymer, wherein styrene is employed as a hard monomer. The copolymer was prepared by the method of Example II using the following reactants.

Parts (dry)
- Monobutyl itaconate _____ 20
- Ethyl acrylate _____ 70
- Styrene _____ 10
- Tertiary dodecyl mercaptan _____ 0.6
- Tergitol NPX _____ 1.2
- Duponol WAQE _____ 1.8
- Triton X-200 _____ 0.4
- Tertiary butyl hydroperoxide _____ 0.75
- Ascorbic acid _____ 0.12
- Water _____ 180

The resulting emulsion copolymer, which contained 11.9 mole percent monobutyl itaconate, 10.6 mole percent styrene and 77.5 mole percent ethyl acrylate was dissolved at 25% by weight total solids in ammonium hydroxide to form a hazy low viscosity solution.

EXAMPLE XX

Example XIX was repeated except that the ethyl acrylate concentration was cut to 60 parts and the styrene was replaced with 20 parts of acrylonitrile. The resulting emulsion copolymer, which contained 10.0 mole percent monobutyl itaconate, 56 mole percent ethyl acrylate and 34 mole percent acrylonitrile, was dissolved at 25% by weight total solids in ammonium hydroxide to form a milky low viscosity solution. The milkiness of the solution was believed to be due to the absorption of water by acrylonitrile units in the copolymer.

EXAMPLE XXI

Example XIX was repeated except that the styrene was replaced by 10 parts vinylidene chloride. The resulting emulsion copolymer, which contained 11.7 mole percent monobutyl itaconate, 11.3 mole percent vinylidene chloride and 77 mole percent ethyl acrylate, was dissolved at 25% by weight total solids in ammonium hydroxide to form a hazy, low viscosity solution.

EXAMPLE XXII

Example XIX was repeated except that the ethyl acrylate concentration was cut to 60 parts and the styrene was replaced by 20 parts isoprene. The resulting emulsion copolymer, which contained 10.7 mole percent monobutyl itaconate, 60.0 mole percent ethyl acrylate and 29.4 mole percent isoprene, was dissolved at 25% by weight total solids in ammonium hydroxide to form an almost clear (brownish haze), low viscosity solution.

EXAMPLE XXIII

This example illustrates the compatibility of a typical preferred copolymer of this invention with various types of polymers (water-soluble or emulsion polymers). A series of 20% by weight total solids compositions were prepared at pH 8.6 using the copolymer of Example II in a weight ratio of 4:1 and 1:1 with the second polymer. The results are set forth below in Table III.

*Table III*

| Test material | 4:1 ratio | 1:1 ratio |
|---|---|---|
| Elvanol 52-22 polyvinyl alcohol | Compatible | Compatible. |
| Naugatex 2734-butadiene-styrene latex. | ----do---- | Do. |
| Rhoplex AC-55-acrylic emulsion | ----do---- | Do. |
| SMA-3000A styrene-maleic anhydride copolymer. | ----do---- | Compatible high viscosity. |
| UBATOL U-7001 styrene-acrylic emulsion. | ----do---- | Compatible. |
| STADEX 87 dextrin | ----do---- | Do. |
| Cascoloid ST-54 casein | ----do---- | Compatible high viscosity. |

EXAMPLE XXIV

This example illustrates the properties of cross-linked clear coatings based on the copolymers of this invention.

A series of ammoniacal solutions were prepared at 25% total solids from the copolymer of Example III and Aerotex M-3 (a melamine-formaldehyde resin). The samples varied from 0 parts to 12.5% Aerotex M-3 and correspondingly from 25 to 12.5% copolymer of Example III. Three mil films were cast on tin plates and then dried at 100° C. for 20 minutes. The various spot tests were made after five minutes contact. The results are set forth below in Table IV.

*Table IV*

PERCENT AEROTEX M-3

| Test | 0 | 2.5 | 5 | 7.5 | 10 | 12.5 |
|---|---|---|---|---|---|---|
| Stability of aqueous solution at room T. | Over 10 days | Over 10 days | 3 days | 3 days | 3 days | 4 days. |
| Stability of aqueous solution at 50° C. | ----do---- | ----do---- | ----do---- | 2 days | 2 days | 1.5 days. |
| Hardness (Sward) | 14 | 16 | 32 | 38 | 32 | 45. |
| Elongation (⅛″ bend) | Passed | Passed | Passed | Failed | Failed | Failed. |
| Impact resistance | Very good | Excellent | Excellent | Good | Fair | Fair. |
| Salt water resistance 1 day immersion | Fair | Good | ----do---- | Excellent | Excellent | Excellent. |
| Water resistance | ----do---- | ----do---- | ----do---- | ----do---- | ----do---- | Do. |
| 10% NaOH resistance | Poor | ----do---- | ----do---- | ----do---- | ----do---- | Do. |
| 10% citric acid resistance | Excellent | Excellent | ----do---- | ----do---- | ----do---- | Do. |
| Acetone resistance | Fair | Good | Good | ----do---- | ----do---- | Good. |
| Alcohol resistance | ----do---- | Fair | ----do---- | Good | Good | Do. |

Table IV indicates that as the concentration of cross-linking agent is increased, the hardness and solvent resistance of the coating increases with an attendant decrease in the flexibility and impact resistance of the coating. Likewise, the higher the concentration of the cross linking agent, the shorter the pot life of the aqueous coating composition. At about 20%±10% by weight Aerotex M-3, the best balance of film properties is attained.

The above compositions were also coated upon paper to form a 3 mil. film and then dried at 100° C. for 10 minutes with similar results.

EXAMPLE XXV

This example illustrates the preparation of a cross-linked clear coating using Cymel 300 (hexamethyl ether of hexamethylol melamine) as a cross-linking agent. An ammoniacal solution of 25% by weight of the copolymer of Example I, 6% by weight Cymel 300, and 0.03% by weight ammonium chloride as a catalyst was coated on an aluminum substrate and cured at 200° C. for 2 minutes. The coating was not removed after 5 minutes in boiling water.

Essentially the same results were obtained using the copolymer of Example III in place of the copolymer of Example I and 0.30% by weight of the ammonium salt of toluene sulfonic acid in place of ammonium chloride. This coating was cured at 177° C. for 30 minutes.

EXAMPLE XXVI

This example illustrates the preparation of a cross-linked clear coating using an epoxy compound as a cross-linking agent. An ammoniacal solution of 25% by weight of the copolymer of Example I and 1% by weight Unox 201 (3,4-epoxy-6-methylcyclohexylmethyl, 3,4-epoxy-6-methyl-cyclohexanecarboxylate) was coated on an aluminum substrate and cured at 70° C. for ten minutes. The clear film had excellent adhesion to the substrate and excellent resistance to aqueous sodium hydroxide. Aqueous ammoniacal solutions of the copolymers and Unox 201 have been kept stable for over a month at room temperature.

Essentially the same results have been obtained with Unox 206 (vinylcyclohexene dioxide).

EXAMPLE XXVII

This example illustrates the preparation of a cross-linked clear alkali insoluble coating for linoleum using an epoxy compound as a cross-linking agent. An ammoniacal solution of 25% by weight of the copolymer of Example II and 0.75% by weight Unox 206 was coated on linoleum and dried at room temperature for 72 hours. The clear glossy coating had excellent adhesion to the substrate and was alkali resistant.

A somewhat softer coating resulted from the replacement of the copolymer of Example II with the copolymer of Example I.

EXAMPLE XXVIII

This example illustrates the preparation of a cross-linked coating using a polyaziridinyl compound as a cross-linking agent. An ammoniacal solution of 25% by weight of the copolymer of Example I and 1% by weight of tris-(1-(2-methyl)aziridinyl)phosphine (MAPO) was coated on a metal substrate and cured at 70° C. for 10 minutes. The film had excellent adhesion to the substrate and excellent resistance to aqueous sodium hydroxide.

Aqueous ammoniacal solutions of the copolymer and MAPO have been kept stable at room temperature for two weeks. Such compositions, even after aging for two weeks, have formed alkali resistant coatings with a room temperature cure. Generally, room temperature cures are not as effective with compositions which have been aged a month due to the fact that approximately 50% of the aziridinyl group hydrolyze during a one month period. Nevertheless, these aged compositions form alkali resistant coatings when cured at elevated temperatures.

MAPO can be replaced by its sulfur analogue MAPS or by other polyaziridinyl compounds such as triaziridinyl melamine.

EXAMPLE XXIX

This example illustrates the preparation of relatively solvent resistant coatings utilizing an aqueous ammoniacal solution of the copolymer of Example II and diethanolamine, which functioned as a cross-linking agent. A series of ammoniacal solutions were prepared at 25% by weight total solids. The samples ranged from 2 to 10% diethanol amine and correspondingly from 18 to 10% copolymers of Example II. Three mil films were cast on tin plates and then dried at 150° C. for 30 minutes or 60 minutes. The various spot tests were made after five minutes contact. The results are set forth in Table V. In the table, I stands for insoluble, S stands for soluble and P.S. stands for partly soluble.

*Table V*

| Test solvent | Cure time in minutes | Percent diethanolamine | | |
|---|---|---|---|---|
| | | 2 | 5 | 10 |
| Water | 30 | I | I | I |
| | 60 | I | I | I |
| Ammonium hydroxide | 30 | P.S. | P.S. | P.S. |
| | 60 | P.S. | P.S. | P.S. |
| Ethyl alcohol | 30 | I | I | I |
| | 60 | I | I | I |
| Methyl ethyl ketone | 30 | P.S. | P.S. | P.S. |
| | 60 | I | P.S. | I |
| Acetone | 30 | P.S. | P.S. | P.S. |
| | 60 | P.S. | P.S. | P.S. |

EXAMPLE XXX

This example illustrates the preparation of release coatings for pressure sensitive tapes. An ammoniacal release coating composition was applied as a 2½ mil film to the back of ribbed paper and then dried at 100° C. for 2½ minutes. While all of the compositions were effective, they were ranked from 1 to 5 in the order of best release with 1 being best.

*Table VI*

| Release composition | | | | Ranking |
|---|---|---|---|---|
| Parts (dry weight) copolymer | Parts cross-linked | Wet parts | pH | |
| 25 parts copolymer of of Example I. | None | 100 | 8.6 | 3 |
| 17.5 parts copolymer of Example III. | 7.5 parts Cymel 300 | 100 | 8.7 | 4 |
| 23.5 parts copolymer of Example III. | 1.4 parts Unox 206 | 100 | 8.5 | 2 |
| 23.5 parts copolymer of Example III. | 1.4 parts Unox 201 | 100 | 8.4 | 1 |
| 45 parts acrylic styrene emulsion polymer sold under the name Ubatol U-7001. | None | 100 | 9.0 | 5 |

Essentially the same results were obtained using a 188° C. cure for 20 seconds.

EXAMPLE XXXI

This example illustrates the preparation of a typical pigment grind and paint formulation using a copolymer of this invention as the primary vehicle. The following pigment dispersion was prepared:

| | Parts | |
|---|---|---|
| | Dry | Total |
| Copolymer of Example I (20% T.S., pH 9) | 30.0 | 150.0 |
| Water | | 40.0 |
| Ammonia (26° Bé.) | | 0.50 |
| Diethyl Carbitol | | 20.00 |
| Daxad 30 | 2.0 | 6.00 |
| Antifoamer | | 0.50 |
| TiPure R-900 (titanium dioxide) | 250.00 | 250.00 |
| Tamol N | 0.50 | 0.50 |

The above 60% solids composition was ball milled for eight hours. Twenty-five parts (dry weight) of the pigment dispersion was then compounded with an additional 25 parts (dry weight) of the copolymer of Example I and 0.1 part antifoamer. The paint composition was diluted with water to 40% total solids and adjusted to a pH of 8.2 with ammonia. The applied paint, after drying, had a gloss rating of 72 on a Gardner 60° Gloss Meter.

Essentially the same results were obtained by replacing all of the copolymer of Example I with the copolymer of Example III, with the copolymer of Example IX and with the copolymer of Example X.

EXAMPLE XXXII

This example illustrates the preparation of typical paint formulations using a copolymer of this invention and a number of conventional latex polymers. Twenty-seven and one-half parts (dry weight) of the pigment dispersion prepared in Example XXXI (containing about 10% by weight of the copolymer of Example I) 10 parts (dry weight) of the copolymer of Example I, 12.5 parts dry weight of a conventional latex polymer and 0.10 parts antifoamer. The paint compositions were diluted to 40% total solids with water and adjusted to a pH of 8.2 with ammonia. The results are set forth below in Table VII.

*Table VII*

| Conventional latex polymer | 60 degree gloss | Swelling | Water resistance | Stability of paint after 6 weeks at room temperature |
|---|---|---|---|---|
| Pylex K-85 styrene. | 60 | Good | Very good | Good. |
| Rhoplex AC-55 acrylic. | 65 | Fair | Excellent | Fair. |
| Naugatex 2734 GRS. | 60 | Good | Good | Good. |
| Ubatol U-7001 styreneacrylic. | 67 | Excellent | Excellent | Good. |

Essentially the same results were obtained by replacing all of the copolymer of Example I in the pigment dispersion and paint with the copolymer of Example III, with the copolymer of Example IX and with the copolymer of Example X.

Since many embodiments of this invention may be made and since many changes may be made in the embodiments described, the foregoing is to be interpreted as illustrative only, and our invention is defined by the claims appended hereafter.

We claim:

1. The process which comprises coating a substrate with an aqueous alkaline solution of a high molecular weight emulsion copolymer comprising as its two essential monomers from 40 to 95 mole percent of alkyl ester of an alpha, beta-ethylenically unsaturated monocarboxylic acid and from 5 to 50 mole percent of half-ester of itaconic acid, wherein the total mole percent of said essential monomers is from 60 to 100 mole percent of said copolymer, and drying the polymeric coating.

2. The process of claim 1 wherein said substrate is a cellulosic material.

3. The process which comprises coating a substrate with an aqueous alkaline solution of a high molecular weight emulsion copolymer comprising from about 20 to 87 mole percent of soft alkyl ester of an alpha, beta-ethylenically unsaturated monocarboxylic acid, from about 5 to 60 mole percent of hard alkyl ester of an alpha, beta-ethylenically unsaturated monocarboxylic acid and from about 8 to 20 mole percent of alkyl half-ester of itaconic acid having from 1 to 18 carbon atoms in its alkyl group, the total being 100 percent, and drying the coating.

4. The process of claim 3 wherein said polymer comprises ethyl acrylate, methyl methacrylate and alkyl half-ester of itaconic acid having from 4 to 8 carbon atoms in its alkyl group.

5. A composition comprising an aqueous alkaline solution of a high molecular weight emulsion copolymer comprising as its two essential monomers from 40 to 95 mole percent of alkyl ester of an alpha, beta-ethylenically unsaturated monocarboxylic acid and from 5 to 50 mole percent of alkyl half-ester of itaconic acid, wherein the total mole percent of said essential monomers is from 60 to 100 mole percent of said copolymer.

6. The composition of claim 5 wherein the alkyl half-ester of itaconic acid comprises monomethyl itaconate and an alkyl half-ester of itaconic acid having from 4 to 8 carbon atoms in its alkyl group.

7. The composition of claim 5 wherein said copolymer comprises a soft alkyl ester of an alpha, beta-ethylenically unsaturated monocarboxylic acid, an alkyl half-ester of itaconic acid having from 4 to 8 carbon atoms in its alkyl group and a hard monomer.

8. The composition of claim 5 wherein said solution has a viscosity of less than about 1000 centipoises.

9. The composition of claim 5 wherein said monocarboxylic acid comprises acrylic acid.

10. A composition comprising an aqueous alkaline solution of a high molecular weight emulsion copolymer comprising from about 20 to 87 mole percent of soft alkyl ester of an alpha, beta-ethylenically unsaturated monocarboxylic acid, from about 5 to 60 mole percent of hard alkyl ester of an alpha, beta-ethylenically unsaturated monocarboxylic acid and from about 8 to 20 mole percent of alkyl half-ester of itaconic acid having from 1 to 18 carbon atoms in its alkyl group, the total being 100%.

11. The composition of claim 10 wherein said copolymer comprises ethyl acrylate, methyl methacrylate and alkyl half-ester of itaconic acid having from 4 to 8 carbon atoms in its alkyl group.

12. A high molecular weight emulsion copolymer which dissolves in aqueous alkali, comprising as its two essential monomers from 40 to 95 mole percent of alkyl ester of an alpha, beta-ethylenically unsaturated monocarboxylic acid and from 5 to 50 mole percent of alkyl half-ester of itaconic acid, wherein the total mole percent of said essential monomers is from 60 to 100 mole percent of said copolymer.

13. The composition of claim 12 wherein the alkyl half-ester of itaconic acid comprises monomethyl itaconate and an alkyl half-ester of itaconic acid having from 4 to 8 carbon atoms in its alkyl group.

14. The composition of claim 12 wherein said copolymer comprises a soft alkyl ester of an alpha, beta-ethylenically unsaturated monocarboxylic acid, an alkyl half-ester of itacoic acid having from 4 to 8 carbon atoms in its alkyl group and a hard monomer.

15. The composition of claim 12 wherein said monocarboxylic acid comprises acrylic acid.

16. The composition of claim 12 wherein said itaconic acid ester comprises an ester having from 4 to 8 carbon atoms in its alkyl group.

17. A high molecular weight emulsion copolymer which dissolves in aqueous alkali, comprising about 20 to 87 mole percent of a soft alkyl ester of an alpha, beta-ethylenically unsaturated monocarboxylic acid, from about 5 to 60 mole percent of a hard alkyl ester of an alpha, beta-ethylenically unsaturated monocarboxylic acid and from about 8 to 20 mole percent of an alkyl half-ester of itaconic acid having from 1 to 18 carbon atoms in its alkyl group, the total being 100%.

18. The composition of claim 17 wherein said copolymer comprises ethyl acrylate, methyl methacrylate, and an alkyl half-ester of itaconic acid having from 4 to 8 carbon atoms in its alkyl group.

19. The composition of claim 5, wherein the alkyl half-ester of itaconic acid comprises monobutyl itaconate.

20. The composition of claim 14, wherein the alkyl half-ester of itaconic acid comprises monobutyl itaconate.

References Cited by the Examiner

UNITED STATES PATENTS

| | | | |
|---|---|---|---|
| 2,790,736 | 4/1957 | McLaughlin et al. | 260—29.6 |
| 2,795,564 | 6/1957 | Conn et al. | 260—29.6 |
| 3,037,881 | 6/1962 | McDowell | 260—29.6 |
| 3,062,686 | 11/1962 | Granlich et al. | 260—29.6 |

WILLIAM H. SHORT, *Primary Examiner.*